(12) United States Patent
Trümper (10) Patent No.: US 10,386,136 B2
(45) Date of Patent: Aug. 20, 2019

(54) SUPPLY SYSTEM WITH A PLURALITY OF CONSUMERS

(71) Applicant: Airbus Operations GmbH, Hamburg (DE)

(72) Inventor: Torsten Trümper, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1012 days.

(21) Appl. No.: 13/921,711

(22) Filed: Jun. 19, 2013

(65) Prior Publication Data

US 2014/0008037 A1 Jan. 9, 2014

Related U.S. Application Data

(63) Continuation of application No. PCT/EP2011/006451, filed on Dec. 20, 2011.
(Continued)

(30) Foreign Application Priority Data

Dec. 20, 2010 (DE) .......................... 10 2010 055 241

(51) Int. Cl.
*F28F 27/00* (2006.01)
*B64D 13/00* (2006.01)
(Continued)

(52) U.S. Cl.
CPC .............. *F28F 27/00* (2013.01); *B64D 13/00* (2013.01); *B64D 2013/0629* (2013.01);
(Continued)

(58) Field of Classification Search
CPC . B64D 13/00; B64D 2013/0629; F28F 27/00; Y02T 50/58; Y02T 50/56; F25D 11/003; F25D 2400/20
(Continued)

(56) References Cited

U.S. PATENT DOCUMENTS 2,925,722 A 2/1960 Blackburn et al.
3,929,305 A * 12/1975 Sabol .................. F28D 15/0266
165/104.22
(Continued)

FOREIGN PATENT DOCUMENTS

CN 102143887 8/2011
CN 103328329 B 1/2016
(Continued)

OTHER PUBLICATIONS

International Search Report for Application No. PCT/EP2011/006451 dated Jun. 20, 2012.
(Continued)

*Primary Examiner* — Joel M Attey
(74) *Attorney, Agent, or Firm* — Jenkins, Wilson, Taylor & Hunt, P.A.

(57) ABSTRACT

A supply system with a plurality of consumers, which can be supplied with a minimum volumetric flow by the supply system to ensure their operational function, wherein the supply system exhibits a network of lines with a plurality of lines, which are each hooked up to the consumers, and a pump connected to the lines for generating a volumetric flow of supply fluid in the lines, wherein the supply system incorporates a network of lines in which consumers are fluidically connected in parallel in relation to the pump arrangement, and wherein each consumer has allocated to it at least one flow control valve functionally placed upstream from the respective consumer in the cooling circulation as viewed from the position of the pump in the direction of flow.

19 Claims, 6 Drawing Sheets

Related U.S. Application Data (60) Provisional application No. 61/424,689, filed on Dec. 20, 2010.

(51) Int. Cl.
*F25D 11/00* (2006.01)
*B64D 13/06* (2006.01)

(52) U.S. Cl.
CPC ........ *F25D 11/003* (2013.01); *F25D 2400/20* (2013.01); *Y02T 50/44* (2013.01); *Y02T 50/56* (2013.01); *Y10T 137/85986* (2015.04)

(58) Field of Classification Search
USPC ........... 165/230, 918, 919; 62/239, 440, 441
See application file for complete search history.

(56) References Cited

U.S. PATENT DOCUMENTS

| | | | |
|---|---|---|---|
| 4,476,893 A | 10/1984 | Schwelm | |
| 4,500,035 A * | 2/1985 | Kuroda | F25B 41/062 137/503 |
| 5,491,979 A * | 2/1996 | Kull | B64D 11/0007 165/104.28 |
| 5,513,500 A * | 5/1996 | Fischer | B64D 11/0007 62/239 |
| 6,508,071 B2 * | 1/2003 | Ota | F04B 27/1804 417/222.2 |
| 6,758,655 B2 | 7/2004 | Sacher | |
| 6,845,627 B1 | 1/2005 | Buck | |
| 6,880,351 B2 * | 4/2005 | Simadiris | B64D 11/04 62/185 |
| 8,051,903 B2 | 11/2011 | Bauer | |
| 2003/0064676 A1 | 4/2003 | Federspiel | |
| 2007/0252039 A1 * | 11/2007 | Wilmot, Jr. | B64D 13/06 244/118.5 |
| 2008/0023181 A1 | 1/2008 | Dunne et al. | |
| 2008/0168786 A1 * | 7/2008 | Eichholz | B64D 13/00 62/208 |
| 2010/0300141 A1 * | 12/2010 | Fujimoto | F25B 1/10 62/498 |
| 2011/0186263 A1 | 8/2011 | Piesker | |

FOREIGN PATENT DOCUMENTS

| | | |
|---|---|---|
| DE | 198 22 682 | 11/1999 |
| DE | 10 2004 017 593 | 11/2005 |
| EP | 1 286 240 | 2/2003 |
| EP | 1 849 704 A1 | 10/2007 |
| EP | 2 655 189 | 12/2018 |
| GB | 2 080 574 | 2/1982 |
| WO | WO 2010/012684 | 2/2010 |

OTHER PUBLICATIONS

Chinese Office Action for Application No. 201180065566.7 dated Dec. 1, 2014.
IPRP and Written Opinion for Application No. PCT/EP2011/006451 dated Jun. 25, 2013.
European Office Action for European Application No. 11813319.8 dated Nov. 16, 2016.

* cited by examiner

SUPPLY SYSTEM WITH A PLURALITY OF CONSUMERS

CROSS-REFERENCE TO RELATED APPLICATIONS

This application is a continuation of and claims priority to PCT Application Serial No. PCT/EP2011/006451 filed Dec. 20, 2011, which claims the benefit of the filing date of German Patent Application No. DE 10 2010 055 241.0 filed Dec. 20, 2010 and of U.S. Provisional Patent Application No. 61/424,689 filed Dec. 20, 2010, the disclosures of which applications are hereby incorporated herein by reference.

TECHNICAL FIELD

The present invention relates to a supply system with a plurality of consumers.

BACKGROUND

Supply systems are already known in the form of aircraft cooling systems, for example for cooling components in gas turbine engines of aircraft. The configuration of such supply systems, in particular of the lines and pump for providing a volumetric flow of fluid in the lines, requires that the supply system be simulated with the consumers provided therein. In the course of this simulation, the fluid supply system with consumers integrated therein along with the performance of the pump and geometric parameters of the lines used therein are designed with reference to a rated volumetric flow in the consumer farthest away in relation to the routing between the respective consumers and the pump of the cooling device. As a result, the pump in addition to the pipe diameter of the fluid supply system are configured in such a way that the consumer located the farthest away in the supply system in relation to the routing between the respective consumers and pump of the cooling device must have a larger volumetric flow provided to achieve the rated volumetric flow required for the latter, so that the pipeline cross sections in the region of the cooling lines remote from the pump must be designed with relatively large dimensions.

Another disadvantage to the known configuration of supply systems is the time and cost involved in executing the simulation and performing the calculation.

SUMMARY

The object of the present invention is to eliminate the problems described above. In particular, the object of the present invention is to provide a supply system having a plurality of consumers, which can be supplied with a minimum volumetric flow by the supply system to ensure their operational function, which is improved in terms of energy and can be technically configured with a simple process.

The object is achieved with the features in the independent claim 1. Additional embodiments are indicated in the subclaims that refer back to the latter.

In particular, the invention provides a supply system or fluid supply system with a plurality of consumers, which can be supplied with a minimum volumetric flow by the supply system to ensure their operational function. The supply system exhibits:

a network of lines with a plurality of lines, which are each hooked up to the consumers, and
a pump connected to the lines for generating a volumetric flow of supply fluid in the lines, wherein the supply system at least partially incorporates a network of lines in which consumers are fluidically connected in parallel in relation to the pump arrangement.

In this conjunction, a "line" is understood as a line segment in which in particular at least one consumer or device to be supplied with power according to the invention is connected. Such a line segment lies in particular between branching locations in the network of lines. In particular, the network of lines provides line segments that run parallel to each other in terms of flow relative to the locality of the pump, so that the respective consumers hooked up in line segments running parallel to each other or integrated therein in terms of flow are connected in parallel. Consumers integrated into the line segments are consumers or devices that are powered by the fluid made to flow in the respective line segment by the pumping output in order to realize their predetermined functionality.

In particular, each consumer has allocated to it at least one flow control valve, which is functionally placed upstream from the respective consumer in the circulating fluid as viewed from the position of the pump in the direction of flow, or placed upstream from the respective consumer opposite the direction of flow of the fluid present in the operational function of the consumer due to the volumetric supply flow.

In particular, then, the solution according to the invention eliminates the former need for performing a complicated simulation during the configuration of the supply system, in which the line cross sections and performance of consumers along with the pump output must be adjusted so as to also supply fluid at a minimum volumetric flow to consumers situated remotely from the pump relative to other consumers as viewed in the direction of fluid flow from the pump.

The solution according to the invention also avoids having to dimension the pump based on the required volumetric flow of consumers located remotely from the pump in relation to other consumers, so that the supply system can be manufactured in an economically optimized manner. The line cross sections for supplying consumers located remotely from the pump do not have to be enlarged to be able to provide these consumers with a sufficient volumetric flow. A reduction in the weight of the supply system is also achieved in this way.

"Located remotely" as used herein means that consumers are located remotely relative to other consumers as viewed in the direction of fluid flow or in relation to the routing between the respective consumers and the pump of the supply system.

The solution according to the invention for a supply system can advantageously be realized in particular as a hydraulic system or cooling system of a vehicle, in particular an aircraft. The supply system according to the invention can be economically realized in particular with a plurality of consumers, since a low simulation outlay ensures the sufficient supply of consumers located remotely from the pump with a sufficient volumetric flow of fluid.

The supply system according to the invention is essentially designed as a closed system, and the consumers connected to the lines of the supply system are located behind the pump as viewed in the direction of flow. Therefore, the pump generates a minimum pressure potential, with which the consumers supply the latter via the fluid with a minimum volumetric flow to the consumers to ensure their operational function. The line resistance causes a pressure loss to arise in the supply fluid owing to the length of the line segments between the pump and respective consumer, in which the fluid conveyed by the pump comes into contact with the pipes or pipe walls with their respective geometries and the consumers.

Resistances between the conveyed fluid and pipe walls as well as fittings in the consumers, such as heat exchangers, cause the fluid to lose pressure potential. The supply system at least partially incorporates a network of lines, in which consumers are connected in parallel from a fluidic standpoint in relation to the arrangement of the pump. In one embodiment, the supply system according to the invention can be completely configured as a network of lines, in which consumers are fluidically connected in parallel relative to the pump arrangement. A pressure loss arises when fluid flows through. Behind the consumers, the fluid is drawn in by the pump or pushed back to the latter, and reaches the pump at a minimal value for pressure potential. Circulation is initiated from there as the fluid is loaded anew at an elevated pressure potential by the pump. As a result, the invention ensures that the pump provides a sufficient pressure potential for the flow to pass through all areas of the circulating fluid, in particular all consumers, meaning that the fluid has enough pressure potential to overcome the still existing pressure losses to get back to the pump.

An embodiment of the supply system according to the invention provides at least one throttle or flow control valve for each consumer. In the circulating fluid, the latter is placed upstream from the respective consumer in the direction of fluid transport, and downstream from a branching of the circulating fluid to the respective user. Therefore, the flow control valve is used to maximally limit the volumetric flow going from the branching of the circulating fluid to the respective user. For example, this is accomplished by using a throttle valve for the flow control valve.

In particular, the flow control valve exerts its effect when its pressure loss rises sharply starting at a specific volumetric flow through the flow control valve. A distinct rise in the volumetric flow passing through the flow control valve is thereby prevented by the sharp rise in pressure loss in the volume restrictor. In particular, the flow control valve is adjusted in such a way that the limit on the volumetric flow that can pass through the flow control valve essentially corresponds to the rated volumetric flow required by the respective consumer.

As opposed to known cooling devices, a supply system according to the invention, in particular the use of the flow control valve, enables a simplified layout and simplified operation of the cooling device. As opposed to known supply systems, in which the volumetric flow generated by the pump would have to be set clearly above the rated volumetric flow in order to also supply the consumer located the farthest away from the pump with the necessary rated volumetric flow, and the pipe diameters must additionally be significantly enlarged to reduce the pressure loss caused by the higher volumetric flow, both problems can be avoided in the configuration of a cooling device according to the invention. This is because essentially the rated volumetric flow is prescribed as the volumetric flow for the cooling device, meaning the volumetric flow generated by the pump. In each of the consumers, using a flow control valve ensures that an excessively high volumetric flow will not be branched off at this location. As a consequence, the volumetric flow generated by the pump can remain in a region situated in proximity to the rated volumetric flow, so that it does not become necessary to increase the volumetric flow from the pump, and also to increase the pressure loss correlated therewith.

Because use can be made of a supply system according to the invention that has lower volumetric flows through the pump in comparison to known supply systems, the pressure losses to be expected, i.e., calculated, in the cooling lines of the cooling device are distinctly lower, so that the cross sections of the cooling lines leading to the consumer located the farthest away from the pump can be significantly smaller in design than for known cooling devices. Reducing the diameters also cuts the overall dimensions and above all the overall weight of the cooling lines, and hence of the entire cooling device. During use in an aircraft, the reduction in weight makes it possible to cut not just the production costs, but primarily the operational costs as well, meaning fuel consumption when operating the aircraft.

As already briefly alluded to above, it is advantageous in a cooling device according to the invention for each flow control valve to be designed in such a way that, when the rated volumetric flow necessary for the respective consumer is exceeded, the pressure loss rises sharply as the consumer volumetric flow continues to increase. This reduces the degree to which the respectively necessary rated volumetric flow for the respective consumers is exceeded. In other words, the branching of the volumetric flow for the respective consumer, meaning the corresponding consumer volumetric flow, is adjusted to the necessary rated volumetric flow for the respective consumer. Of course, a separate, meaning different, rated volumetric flow may be required for each consumer, which can be taken into account by means of corresponding individually adjustable, or individually adjusted, flow control valves.

The consumer volumetric flow is hence to be understood as the volumetric flow that passes through the respective consumer. Understood by the necessary rated volumetric flow for the respective consumer is the volumetric flow that must pass through the consumer to achieve the cooling capacity desired there.

As a result of the flow control valve design according to the invention, the sharp rise in pressure loss, i.e., in particular a kink in the pressure loss curve, imposed by the volumetric flow reduces the degree to which the respectively necessary rated volumetric flow is exceeded. In other words, while the rated volumetric flow can basically be exceeded in this way, the degree to which it is exceeded is reduced by the sharp rise in pressure loss after it has been exceeded. In other words, the flow control valve is a self-regulating element that reduces the volumetric flow for the respective consumer, or consumer volumetric flow, to the desired values without any active regulatory intervention, in particular in the range around the necessary volumetric flow for the respective consumer.

Another advantage is for the individual consumers in a cooling device according to the invention to be arranged parallel to each other in the circulating fluid. The advantage to a parallel arrangement of consumers in the circulating fluid is that the pressure drop in all consumers is essentially the same, meaning that essentially the same pressure loss is to be calculated for all consumers. This simplifies both the regulation and configuration of the cooling device. In particular, the pressure loss is balanced out by connecting the consumers via the interconnected backflow to the pump.

Another advantage is for at least one of the flow control valves in a cooling device according to the invention to be designed as a throttle valve. Such a throttle valve can hence be a simple throttle that is essentially self-regulating, as already explained further above, but also an actively regulated throttle valve, with which the desired level of consumer volumetric flow can be precisely and adjustably set.

Also advantageously provided when using an actively regulated throttle valve are sensors, i.e., flow meters, which are situated in front and back of the respective flow control valve. The throttle valve can be controlled by comparing the respectively measured values for the consumer volumetric flow in front and back of the throttle valve with a preset value for the rated volumetric flow of the respective consumer, so as to keep the consumer volumetric flow close to the predefined rated volumetric flow for the respective consumer in question.

It can also be advantageous in a cooling device according to the invention for the flow control valve to leave the consumer located the farthest away from the pump with an additional pressure potential for the fluid. This additional pressure potential exceeds the necessary pressure potential for this consumer, which is situated the farthest from the pump. Expressed differently, the pressure potential of the supply fluid diminishes continuously as the result of the steady pressure loss on the pipe walls of the cooling lines as the fluid in the supply system circulates, meaning from consumer to consumer with an increasing distance from the pump. In order to now ensure that enough of a flow passes through all consumers as desired, in particular to also include the consumer lying the farthest away from the pump, the supply system must be set in such a way during its configuration that the last consumer is still reached by a sufficiently high pressure potential as well. A sufficiently high pressure potential is here a pressure potential greater than or equal to the pressure potential necessary to overcome the pressure loss prescribed during the design of the last consumer while a flow passes through the latter. If the pressure loss, i.e., the necessary pressure potential for the consumer located the farthest away from the pump, were greater than the residual pressure potential of the fluid before this last consumer, this last consumer would only carry a partial flow, or none at all in the worst case scenario. Such an underperformance with respect to the flow of supply fluid would cause the system function of this consumer to underperform, or even to fail completely. Since the systems used in a cooling device according to the invention designed for use in aircraft are especially relevant in terms of safety, such a risk is thus unacceptable.

By designing the supply system in such a way as to retain an additional pressure potential of the fluid that clearly exceeds the necessary pressure potential at the consumer lying the farthest away from the pump, a level of safety is prescribed making it probable that the remaining value for the pressure potential of the fluid in front of the consumer lying the farthest away from the pump will still be sufficient to overcome the corresponding pressure loss of this consumer, even given smaller leaks in the circulation line or fluid of the supply system.

In addition, providing an additional pressure potential as described in the invention can impart a greater flexibility to a cooling device. As a consequence, it is possible to also integrate more consumers into the cooling device without having to change anything about the configuration of the cooling device, in particular with respect to mechanical designs for the cooling lines or the pump itself. Rather, individual consumers can also be completely disabled or enabled even by way of valves, without negatively impacting the functionality of all consumers, in particular the consumer lying the farthest away from the pump.

In cases where the configuration of a supply system according to the invention is not necessarily supposed to result in a higher flexibility, it may be advantageous for the flow control valve to reduce the diameter of the individual lines toward the consumers to a minimum in a cooling device according to the invention. In this way, the consumer located the farthest away from the pump is provided with a pressure potential for the fluid greater than or equal to the necessary pressure potential for this consumer. Advantageous in particular is a design in which the pressure potential of the supply fluid in front of the last consumer in terms of its arrangement relative to the pump is essentially identical to or only negligibly larger than the pressure potential necessary for overcoming the pressure loss of this consumer. In other words, this case involves a minimum configuration, so that the fluid supply system makes the necessary pressure potentials available for all pressure losses of all consumers without greatly exceeding the latter.

Because one embodiment of the invention provides a flow control valve for all consumers, the volumetric flow generated by the pump, and hence the additional pressure losses, can also be reduced via pipe resistances in the lines. In other words, reducing the pressure losses by means of pipe resistances makes it possible to cut the pipe diameter, which is in turn accompanied by a decrease in the costs and weight of the entire supply system.

It is also advantageous for the fluid to be an incompressible medium in an embodiment of the supply system according to the invention, in particular one designed as a hydraulic system or cooling system. The advantage to using an incompressible medium as the fluid is that it greatly simplifies both the configuration and the calculation of pressure losses, since pressure differences need not be taken into account given the incompressibility of the fluid. Of course, incompressible media can here also be understood as a medium that exhibits a slight compressibility, but the latter is negligible from a technical standpoint. Essentially most liquids are basically here to be understood as incompressible media within the framework of the present invention.

It is further advantageous for the diameters of the individual cooling lines of the circulating fluid to be essentially constant in a fluid supply system according to the invention. This is also easily achieved by using flow control valves for the individual consumers as described in the invention. The advantage to the essentially constant cross section of the cooling lines is that this makes it possible to still use standard pipes for the entire cooling device. Avoided in particular is a situation in which varying pipe cross sections in the supply system could lead to an elevated potential for errors in assembling the supply system. This also makes it possible to avoid transitions between different pipe cross sections, which in turn is usually accompanied by an additional pressure loss.

An embodiment of the supply system according to the invention provides that a flow control valve be allocated to each consumer hooked up to the supply system.

In particular, the flow control valves can be designed in such a way as to generate a disproportionately large increase in pressure loss starting at a rated volumetric flow in the respective line given a certain rise in the volumetric flow of fluid supplied in the respective line, so that the volumetric flow processed by each consumer is identical within a maximum deviation of 20%.

An embodiment of the supply system according to the invention provides that a flow control valve be integrated at least in regions of the line network in each consumer.

The supply system can generally be a cooling system of a vehicle, and in particular an aircraft, and a cooling medium can here be used as the fluid. The supply system can also generally be an air conditioning system for a vehicle, in particular an aircraft, and air can be used as the fluid. The supply system can also be a hydraulic system for a vehicle, in particular an aircraft, and oil can be used as the fluid.

An embodiment of the supply system according to the invention provides that
- a portion of the flow control valves be designed in such a way that a flow control valve setting device can be used to variably adjust the pressure loss as a function of volumetric flow,
- the supply system additionally exhibits at least one respective sensor for measuring the fluid pressure and/or volumetric flow in the line on at least one portion of the flow control valves and viewed in the direction of fluid flow in front of the respective consumers allocated thereto, and that
- the supply system exhibits a controller that is functionally linked with the flow control valve setting device and sensors, and adjusts the flow control valves in such a way that the respective pressure and/or volumetric flow has a minimum value In particular, the used fluid can be an incompressible medium.

An embodiment of the supply system according to the invention provides that the diameters of the individual cooling lines of the cooling circulation be constant to within a maximum deviation of 10%.

In order to configure an embodiment of the supply system according to the invention, a method for configuring an embodiment of a supply system according to the invention in which the supply system at least partially incorporates a network of lines that exhibit consumers fluidically connected in parallel relative to the pump arrangement is implemented with the following steps:
- Determine the necessary rated volumetric flow for each consumer,
- Determine the pressure loss of all consumers,
- Calculate the pipe pressure loss for the cooling lines, and
- Select a pump as a function of the determined and calculated pressure losses.

Using a method according to the invention for an embodiment of the cooling device according to the invention makes it possible to take the presence of the flow control valve into account during the configuration process, in particular when selecting the pump. As was explained above in detail, the flow control valve makes it possible to significantly reduce the volumetric flow necessary for the line circulation in all consumers by comparison to known fluid supply systems, in particular to a range close to the rated volumetric flow. Therefore, this enables a pump that is smaller, lower-performance, and hence more cost effective and lightweight in comparison to known supply systems.

A method according to the invention can advantageously be further developed in such a way after selecting the pump as to calculate the pressure potential of the fluid in front of the consumer located the farthest away from the pump. The advantage to calculating this pressure potential is that the latter pressure potential can be taken into consideration depending on the desired configuration of the supply system while selecting the pump and also configuring the lines, in particular the pipe diameter. In particular the two options described below are possible for configuration based on this remaining pressure potential.

On the one hand, it can be advantageous to select the pump in such a way that the pressure potential of the fluid in front of the consumer located the farthest away from the pump is greater than the necessary pressure potential of the fluid in front of this consumer. As also described extensively in relation to a cooling device according to the invention, this configuration involves providing an additional pressure potential that is accompanied either by an enhanced safety of the fluid supply system during operation, or by an elevated flexibility of the supply system in terms of connecting additional consumers.

As an alternative, the pump can be selected in such a way in a method according to the invention that the pressure potential in front of the consumer lying the farthest away from the pump is equal to the necessary pressure potential of the fluid in front of this consumer. In particular, the pressure potential in such a configuration essentially approximates the pressure potential necessary for overcoming the pressure loss of the corresponding consumer. While no safety buffer will remain as a result, both the pump and pipes comprising the lines of an embodiment of the fluid supply system according to the invention can be made smaller in design, and hence more lightweight and cost effective. As a consequence, this embodiment represents a kind of minimal configuration.

According to another aspect of the invention, a supply system is provide, wherein the supply system (10) is a cooling system (100) for cooling storage containers that are stowed in stowage locations within an aircraft fuselage, said cooling system (100) comprising at least one central cooling plant, at least one heat exchanger as consumer (20a, 20b, 20n) arranged external to said storage containers at each of said stowage locations, a cooling medium, and a cooling medium distribution conduit system connecting said cooling plant with said heat exchangers, wherein said conduit system includes a supply conduit and a return conduit each connected with said cooling plant, and connector conduits connecting said heat exchangers with said supply and return conduits, wherein in each connector conduit at least one flow control valve (50a, 50b, 50n) is installed, which is functionally placed upstream from the respective consumer (20a, 20b, 20n) in the respective connector conduit as viewed from the position of the pump in the direction of flow.

According to an embodiment of the cooling system according to the invention, a supply system is provided, wherein the cooling system comprises only one said cooling plant.

According to an embodiment of the cooling system according to the invention, said supply and return conduits are arranged below said cabin floor and extend over substantially the entire length of said cabin.

According to an embodiment of the cooling system according to the invention, the cooling system further comprises respective quick connectors provided on respective ones of said connector conduits and adapted to couple said respective connector conduit to one of said return and supply conduits at one of a plurality of coupling locations along said return conduit and said supply conduit, and comprising connector adapters provided at said plurality of coupling locations along said return conduit and said supply conduit, and wherein said quick connectors are adapted to couple said connector conduits to said adapters.

According to an embodiment of the cooling system according to the invention, said cooling medium is a liquid coolant, and said conduits of said distribution conduit system are liquid coolant conduits.

According to an embodiment of the cooling system according to the invention, said cooling medium is a vaporizable refrigerant, said supply conduit is a liquid refrigerant supply conduit, said return conduit is a vapor refrigerant return conduit, and said heat exchanger is an evaporator.

According to an embodiment of the cooling system according to the invention, said distribution conduit system further comprises a pump adapted to convey said cooling medium through said distribution conduit system.

According to an embodiment of the cooling system according to the invention, said cooling plant comprises a compression cooling plant.

According to an embodiment of the cooling system according to the invention, said cooling plant comprises a fuselage skin heat exchanger arranged on said fuselage.

According to an embodiment of the cooling system according to the invention, said cooling plant comprises a liquid/air heat exchanger adapted to be cooled by a primary cooling air flow, wherein said aircraft further includes air conditioning packs, and wherein said 30 primary cooling air flow is a cooled air flow provided by said air conditioning packs.

According to an embodiment of the cooling system according to the invention, said cooling plant comprises an adsorption cooling apparatus.

According to an embodiment of the cooling system according to the invention, said cooling plant comprises an adsorption cooling apparatus.

According to an embodiment of the cooling system according to the invention, said liquid coolant is a water/glycol mixture.

BRIEF DESCRIPTION OF THE DRAWINGS

The present invention will be described in greater detail based on the attached drawings on the figures. The terms "left", "right", "top" and "bottom" here relate to an orientation of the drawings on the figures with normally legible reference numbers. Shown on:

FIG. 1 shows a first embodiment of the supply system 10 according to the invention and, for example, a cooling or hydraulic system, in the form of a diagrammatic view of a flowchart for the fluid in the lines. The supply system in this embodiment exhibits a circulation 30 which incorporates a pump 60. For example, the pump 60 can be a centrifugal pump, which supplies a variable or constant volumetric flow of fluid for the circulation 30. In other words, the pump 60 transports the fluid through the fluid circulation 30. In turn, the fluid circulation 30 consists of a plurality of cooling lines 40, which connect the pump with the individual consumers 20a, 20b and 20n. The designation of consumers 20a, 20b and 20n is here to be understood to mean that any number of consumers can be involved, i.e., n consumers. FIG. 1 provides an exemplary diagram of an arrangement with three consumers 20a, 20b and 20n.

DETAILED DESCRIPTION

Figure 1:
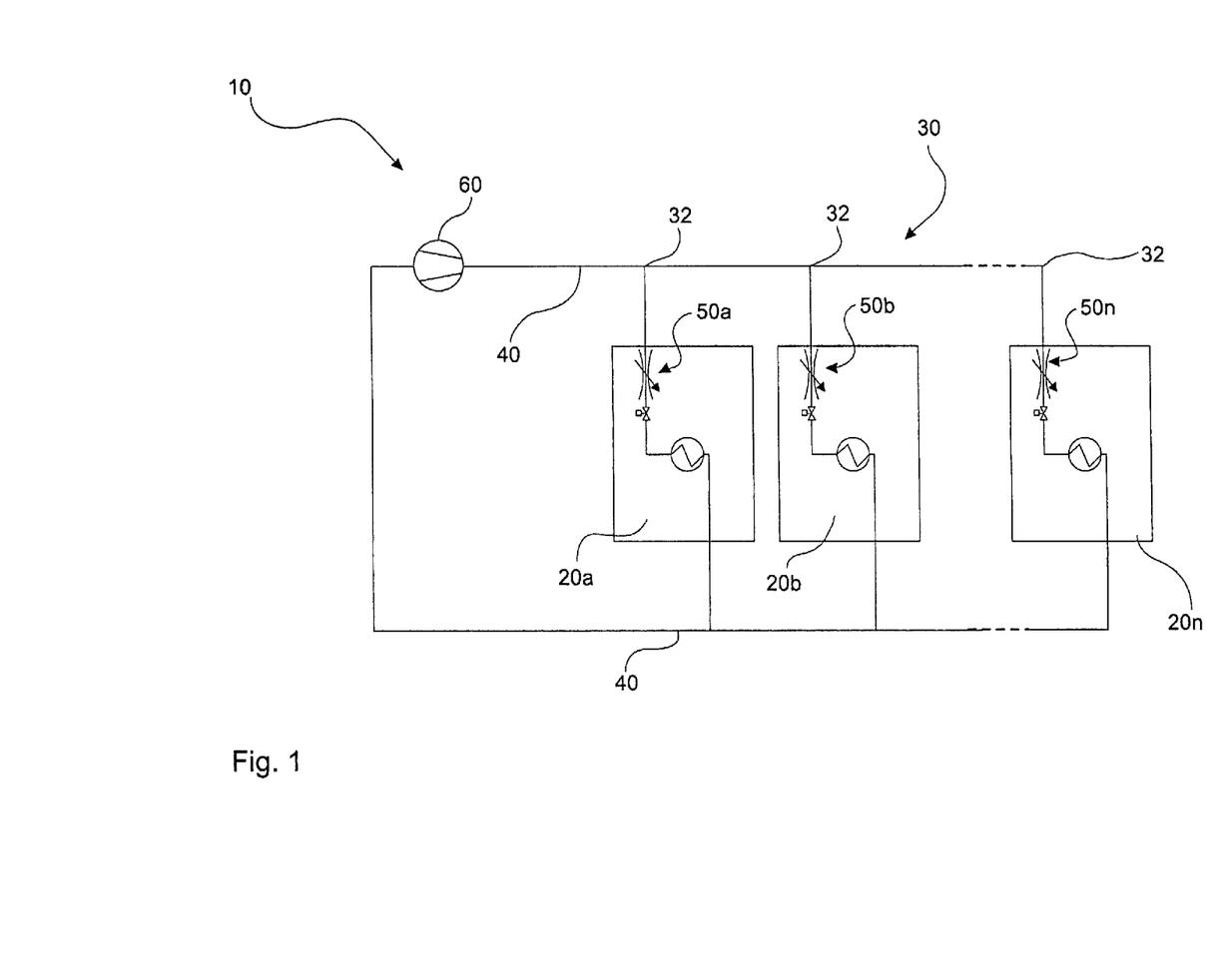
FIG. 1 is a diagrammatic view of a flowchart for an embodiment of the supply system according to the invention.

Consumers 20a, 20b and 20n in the embodiment on FIG. 1 are connected in parallel. This means that a branch 32 in the fluid circulation 30 is thus provided for each of the consumers 20a, 20b and 20n, supplying the receptive consumers 20a, 20b and 20n with fluid from the corresponding cooling line 40. The supply system 10 at least partially accommodates a network of lines, wherein the consumers are fluidically connected in parallel relative to the pump arrangement.

In addition, each consumer is provided with a volumetric flow restrictor or throttle, or a flow control valve 50a, 50b and 50n, which to the extent desired regulates the consumer volumetric flow, meaning the volumetric flow, passing from the cooling line 40 into the consumer 20a, 20b and 20n and running through the latter. In particular, the flow control valves 50a, 50b and 50n involve throttle valves, which are designed to either be self-regulating or actively regulated.

Figure 3:
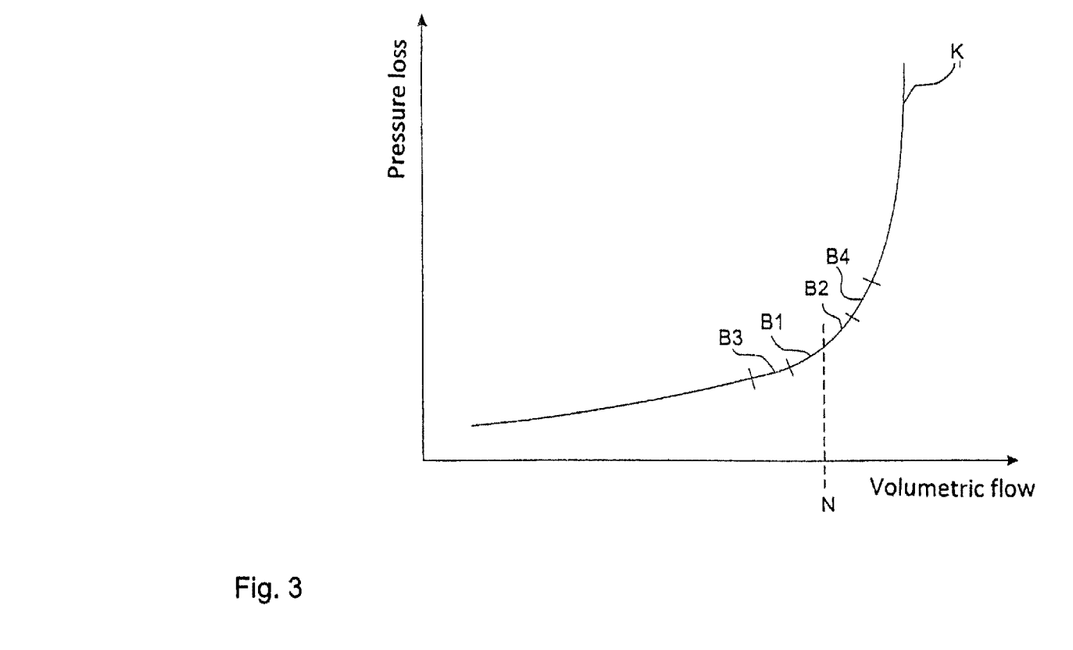
FIG. 3 is a view showing the progression of pressure loss recorded over the volumetric flow for an embodiment of a flow control valve for a supply system

The characteristic curve for the fluidic action of the flow control valve 50a, 50b and 50n is exemplarily depicted for an embodiment of the supply system on FIG. 3. The pressure loss caused by the respective flow control valve 50a, 50b and 50n is there recorded for an actual volumetric flow through this flow control valve 50a, 50b and 50n actually arising there. As evident, this case involves a graph exhibiting a relatively sharp bend or kink in the region of a rated volumetric flow N denoted with a dashed line, starting at which the pressure loss rises to a disproportionately strong degree over the continued increase in the volumetric flow. In particular, the characteristic line K for the used flow control valves is designed in such a way that they generate a disproportionately high increase in pressure loss starting at a rated volumetric flow in the respective line given a certain growth in the volumetric flow of fluid supplied in the respective line, so that the volumetric flow processed by each consumer is identical within a maximum deviation of 20%. The characteristic line K can here run in such a way that the rise in pressure loss on both sides of the rated volumetric flow for the characteristic curve in regions B1, B2 originating from the latter with a size of 10% of the rated volumetric flow N is more than 10% greater than in an equally large region B3 of the characteristic line, at least viewed in the direction opposite the volumetric flow in front of these regions, and alternatively thereto in a region B4 behind these regions as well.

In particular, the flow control valves 50a, 50b and 50n are configured in such a way that the kink in the characteristic line as depicted on FIG. 3 arises for a volumetric flow that essentially corresponds to the rated volumetric flow through the respective consumer or approximates the latter. In other words, the rise in volumetric flow through the respective flow control valve 50a, 50b and 50n is thus simultaneously accompanied by an increase in the corresponding pressure loss on the flow control valve 50a, 50b and 50n. As soon as the volumetric flow through the flow control valve 50a, 50b and 50n has reached the kink in the characteristic line, meaning in particular the rated volumetric flow for the respective consumer 20a, 20b and 20n, there will be a disproportionately sharp rise in pressure loss. The large increase in pressure loss here essentially prevents the volumetric flow passing through the flow control valve 50a, 50b and 50n from rising further. Prevents here does not imply that the rise in volumetric flow through the flow control valve 50a, 50b and 50n is completely stopped, but rather that a continued rise is tangibly slowed. This keeps to a minimum the degree to which the rated volumetric flow is exceeded.

Therefore, it can also be concluded that the use of flow control valves limits the extraction of the respective consumer via the branch 32 from the line 40 to the respectively desired value of volumetric flow for the consumer 20*a*, 20*b* and 20*n*, or the corresponding rated volumetric flow N.

Figure 2:
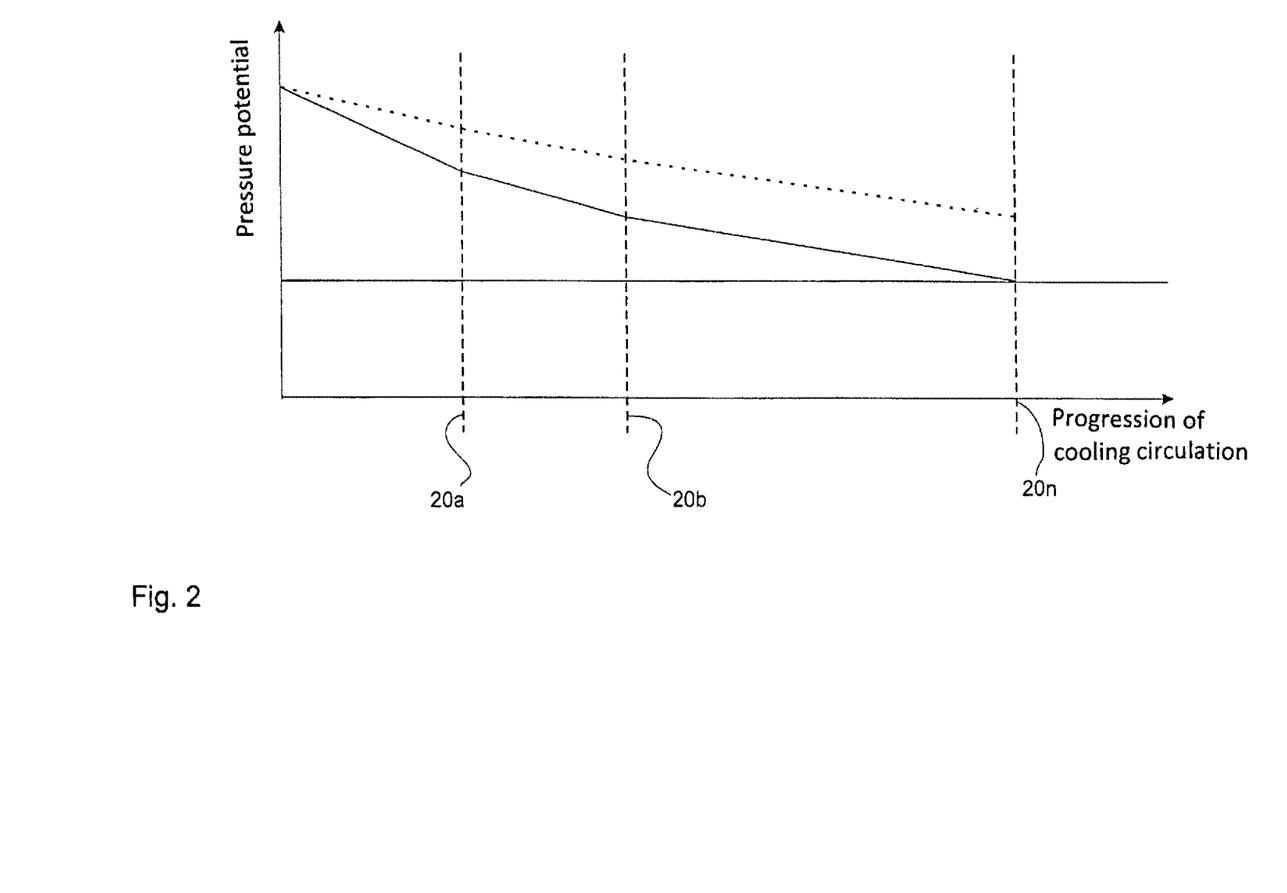
FIG. 2 is a diagrammatic view of the pressure potential over the course of an embodiment of a supply system according to the invention.

FIG. 2 illustrates one critical advantage that can here be achieved with an embodiment of a supply system according to the invention and, for example, a cooling device 10, in particular the use of the flow control valve 50*a*, 50*b* and 50*n* as described in the invention. This FIG. 2 presents the pressure loss for the fluid, or its pressure potential, as recorded over the course of the fluid circulation, in particular the course of the line 40 from the pump 60 to the consumer 20*n* lying the farthest away from the pump 60. Two characteristic lines are here depicted, and differ in that the solid characteristic line represents a characteristic line for a supply system according to prior art, while the dashed line involves a characteristic line for a supply system 10 according to the present invention. In addition, vertical dashed lines are also used to denote the three positions of the branches 32, at which fluid is removed from the cooling lines 40 in the respective consumer 20*a*, 20*b* and 20*n*.

As evident, the pressure potential for both characteristic lines constantly tapers off over the course of the fluid circulation 30. This constant tapering stems from the friction on the pipe wall of the lines 40, which is associated in particular with the type of fluid and its speed, i.e., its volumetric flow. The basic precondition for the functional capacity of a supply system 10 according to the invention is that the consumer 20*n* located the farthest away from the pump 60 still have enough pressure potential for the fluid to also be able to flow through this last consumer 20*n*. This pressure potential needed for the above purpose can also be referred to as the minimum pressure potential, and may be gleaned from the horizontal line on FIG. 2.

In known supply systems and, for example, cooling devices, an elevated volumetric flow is generated by the pump 60 in order to ensure that the necessary pressure potential at the last consumer 20*n* can be sustained in relation to the pump 60.

The increase in volumetric flow is associated with a problem, specifically with the fact that the elevated speed of the fluid in the lines 40 raises the friction in the pipes, and hence the pressure loss. This is reflected on FIG. 2 by the fact that the solid characteristic line for known cooling devices drops relatively steeply, and is encumbered by an elevated pressure loss owing to the increased volumetric flow. A portion of the volumetric flow is diverted at the branch 32 to the first consumer 20*a*, causing the speed of the fluid in the ensuing section of the line 40 to fall, so that the falling gradient of the characteristic line for known cooling devices also becomes smaller. The same happens at the branch 32 to the second consumer 20*b* all the way to the last consumer 20*n*. In order to ensure that the gradient does not become too high despite the elevated volumetric flow through the pump 60, the dimensions of pipes for lines 40 in known cooling devices must be large enough to keep the pressure loss down to a level that enables a kind of precision landing on the necessary pressure potential for the consumer 20*n* located the farthest away from the pump 60.

As opposed to known cooling devices, using a flow control valve 50*a*, 50*b* and 50*n* in a supply system 10 according to the invention limits the branched volumetric flow for the respective consumer 20*a*, 20*b* and 20*n* in particular to the respective rated volumetric flow for the respective consumer 20*a*, 20*b* and 20*n*. As a result of the limitation, the subsequent volumetric flow after the branch is only reduced by the corresponding branched volumetric flow, i.e., by the necessary rated volumetric flow. This also makes it possible to work with a significantly lower volumetric flow through the pump 60 than is the case in known cooling devices. The lower volumetric flow and accompanying lower speed in the lines 40 results in less of a pressure loss over the course of the lines 40, and hence in a smaller gradient for the drop in the corresponding characteristic line (dashed line) on FIG. 2. In other words, a lower volumetric flow can be used, and automatically leads to a lower pressure loss.

As a consequence, the two obvious advantages to the embodiment of a cooling device 10 according to the invention may be gleaned from FIG. 2. On the one hand, a lower volumetric flow can be used, and directly leads to a higher pressure potential, i.e., an additional pressure potential at the branch 32 to the consumer 20*n* located the farthest away from the pump 60. This additional pressure potential can be used in two ways. First, this additional pressure potential can be used as a safety clearance to the necessary pressure potential at this position, i.e., so as to be able to collect any leaks that might come about in the circulating fluid 30. A greater flexibility can also be set with the additional pressure potential, for example by hooking up additional consumers not depicted on the figure to the cooling device 10.

In cases where neither an elevated flexibility nor an enhanced safety are desired or necessary, this additional pressure potential can be used to impart smaller dimensions to the pump 60, or to reduce the geometries, in particular the diameters, of the pipes for the lines 40. This reduction saves on costs for the pump and pipes, and also cuts down on weight. With respect to FIG. 2, optimizing the design of a cooling device 10 as mentioned above would lead to a parallel shift of the corresponding characteristic line (dashed line on FIG. 2). The latter would be shifted parallel downward until the point where the characteristic line intersects the position of the consumer 20*n* located the farthest away from the pump 60 essentially lies on the horizontal line corresponding to the pressure potential of the fluid necessary for overcoming the pressure loss of the corresponding last consumer 20*n*.

In an embodiment of the fluid supply system 10 according to the invention, at least one flow control valve arranged on a device is designed to variably set the pressure loss achieved with the flow control valve in the line segment in front of the consumer in question by means of a respective flow control valve adjusting device. To this end, the line segments in which the volumetric flow of the fluid is to be set or regulated for consumers respectively integrated therein can incorporate at least one sensor device for measuring the pressure loss respectively generated by the flow control valve and/or a sensor device for measuring the volumetric flow of fluid in the line segment. The fluid supply system 10 here further exhibits a controller, which is functionally connected with the flow control valve adjusting device for setting the latter, and the sensor devices for receiving the respective sensor signals generated by the latter or acquired flow states.

In particular, the sensor device for measuring the pressure loss can be realized by means of a first pressure sensor lying in front of the respective consumer in relation to the direction of fluid flow and a second pressure sensor lying in back of the respective consumer in relation to the direction of fluid flow. Based on these sensor values for the local pressure of the fluid at the corresponding locations generated by the first and second pressure sensors within a prescribed period of time, the controller can determine the pressure loss in the fluid caused by the flow control valve in its respective flow control valve setting. Characteristic values determined in preliminary tests or calibrations of the flow control valve, e.g., stored in the controller as a table, can be used by the controller to ascertain the volumetric flow generated at the flow control valve in the respective line segment. Alternatively or additionally, it can be provided that a sensor device for determining the volumetric flow correspondingly integrated into the line segment be used to determine the volumetric flow in the latter. Based on the volumetric flow of the fluid streaming in the respective line segment ascertained by the controller as the actual value, the controller can use a target, which can be a prescribed constant or generally prescribed by way of a system function that is functionally allocated to the controller, to generate a command signal to the flow control valve adjusting device and transmit it thereto for commanding and setting the flow control valve. In particular, the command signal can be generated by way of an aforementioned actuation table implemented in the controller and/or a regulatory function. A predetermined volumetric flow can hence be set in the respective line segment independently of the geometric characteristics of the line segment and other conditions in the line segment. In particular, a volumetric flow can be specifically adjusted for the at least one consumer respectively integrated into the line segment.

In such an embodiment, the controller can in particular be functionally connected with at least two flow control valves of the fluid supply system 10, wherein the at least two flow control valves exhibit the same characteristic line for the pressure loss over the volumetric flow according to FIG. 3.

For example, this embodiment can be realized in a cooling system of a passenger aircraft, which can be provided for cooling the consumers of various facilities aboard the same aircraft, such as kitchens or the cockpit. In this case, it is advantageous to use the same cooling aggregates in different facilities of this type, and hence line segments that can each be set by way of a flow control valve adjusting device.

Figure 4:
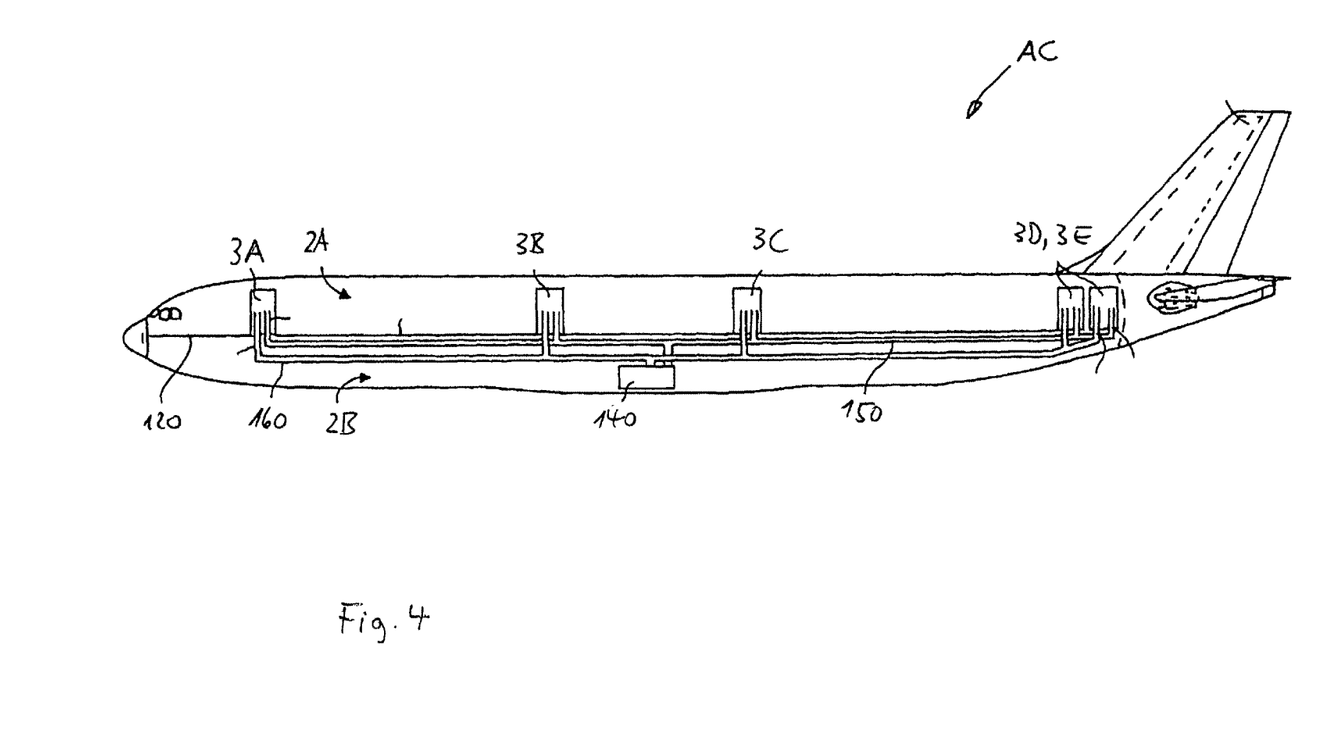
FIG. 4 is a schematic general view of the cooling system for cooling foods in an aircraft, according to the invention.
Figure 5:
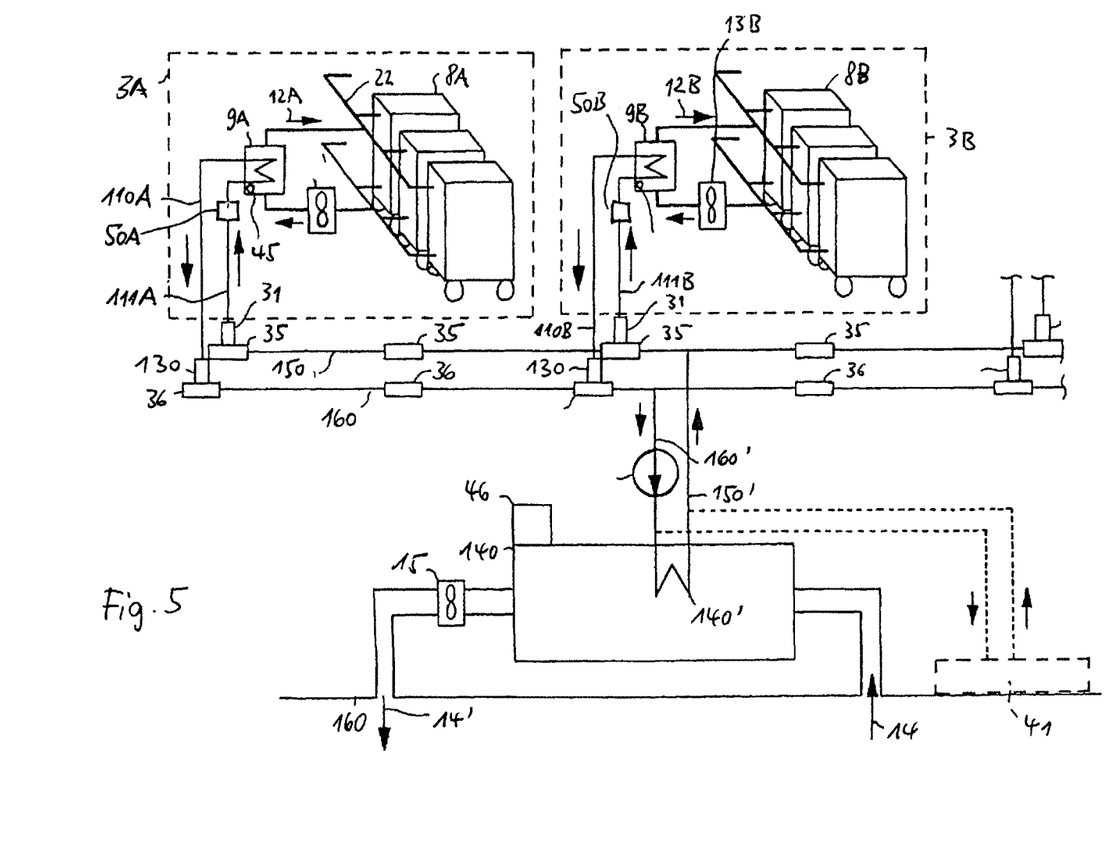
FIG. 5 is a more detailed schematic view of the cooling system according to the invention, using a liquid coolant and a compressor cooling plant.

FIG. 4 schematically shows a general overview of a cooling system 100 for cooling food in an aircraft AC. The food to be cooled is stored in typical known catering containers or so-called trolleys 8A, 8B (see FIG. 5). Except during the passenger service periods, the trolleys are stowed at pre-plurality of on-board galleys 3A to 3e, for example, arranged at various locations within the cabin of the aircraft AC. Preferably, a single central cooling plant 140 is arranged below the cabin floor 120 in an underfloor space such as an equipment or cargo hold. Thus, the central cooling plant 140 is arranged outside of the enclosed cabin space. The central cooling plant 140 provides cooling energy via a cooling medium to each of the on-board galleys 3A to E, through a distribution conduit system including a supply conduit 150 and a return conduit 160. Thus, the supply conduit 150 supplies a cooling medium such as a liquid coolant or a vaporizable refrigerant to the respective cooling loads, where the cooling medium absorbs heat from the food to be cooled. Then the return conduit 160 returns the cooling medium back to the cooling plant 140. The distributor system including the conduits 150 and 160 is preferably arranged to extend along substantially the entire aircraft cabin zone, near the cabin floor 120 and preferably below the floor 120 and thus outside the passenger cabin.

FIG. 2 shows a particular embodiment of the cooling system 1 according to the invention, using a simple liquid coolant as a cooling medium. The distribution system essentially comprises coolant conduits including a coolant supply conduit 150 and a coolant return conduit 160. The central cooling plant 140 removes heat from the coolant returning in return conduit 160 and then provides the cooled coolant to the supply conduit 150.

Heat exchangers 9A, 9B are respectively arranged in the on-board galleys 3A, 3B.

According to the invention, said conduit system includes a supply conduit and a return conduit each connected with said cooling plant, and connector conduits connecting said heat exchangers with said supply and return conduits, wherein in each connector conduit at least one flow control valve 50A, 50B is installed, which is functionally placed upstream from the respective heat exchangers 9A, 9B having the function of consumers 20a, 20b, 20n in the respective connector conduit as viewed from the position of the pump in the direction of flow.

It should be understood that only galleys 3A and 3B are shown in FIG. 2 for the sake of clarity, but the remaining galleys, for example 3C to 3E, have a similar arrangement as that described here with respect to galleys 3A and 3B. Connector conduits 110A, 111A respectively connect each heat exchanger 9A, 9B to the supply conduit 150 and the return conduit 160. The liquid coolant is preferably a water/glycol mixture, which has a relatively good heat capacity, whereby the coolant conduits can have a relatively small diameter to advantageously save space and allow convenient routing of the conduits. The supply and return conduits are insulated. When the conduits 150 and 160 are originally installed, connector adapters 35 and 36 are provided at several locations along each conduit 150 and 160. The locations of the adapters correspond to potential desired locations for the on-board galleys in various configurations of the cabin, for example.

In order to achieve different cabin layouts, the on-board galleys 3a to 3e can easily be repositioned to any location at which a connector adapter has been previously installed. The particular construction of such adapters and quick connectors is not part of the present invention and is generally understood in the art. It is also possible to use quick connectors that can form a leak-free connection with the supply and return conduits without an intermediate adapter, as is known in the art.

In FIG. 2, the heat exchangers 9A, 9B provided in the galleys 3A, 3B are embodied as liquid/air heat exchangers through which the coolant flows in a primary circuit and air flows in a secondary cooling air circuit 12A, 12B. A blower 13A, 13B drives the air flow of the secondary cooling air circuit 12A, 12B, for example. In each cooling air circuit 12a, 12b, the air is cooled as it passes through the heat exchanger 9A, 9B, and then flows through a supply distributor 22 to the catering trolleys 8A, 8B. There, the cooling air removes heat from the food that is to be cooled. The warmer air is removed from the catering trolleys through a return distributor 23 by the blower 13A, 13B and is circulated back to the heat exchanger 9A, 9B, where the excess heat is removed by the coolant provided by the supply conduit 150 and the connector conduits 11A, 11B. The warmed coolant then returns to the cooling plant 140 via the connector conduits 10A, 10B and the return conduit 160. If cooling is not necessary in any one of the galleys 3A, 3B, for example if no trolleys 8A, 8B are being stowed in the galley, then the respective blower 13A, 13B can be switched off, to stop the flow of cooling air in the respective cooling air circuit 12A, 12B. Similarly, if fewer than the maximum number of trolleys 8A, 8B are stowed in a galley, the unused outlet(s) or inlet(s) of the cool air supply distributor 22 and return distributor 23 can be closed off in a generally known manner.

FIG. 2 also shows the preferred embodiment of the central cooling plant 140, which comprises a compressor cooling unit according to one embodiment of the invention. Therefore, the cooling unit essentially consists of an evaporator, a condenser, a compressor and an expansion nozzle, using a vaporizable refrigerant in a closed loop. The evaporator of the closed loop 130 refrigerant cycle corresponds to a heat exchanger 140 of the distribution conduit system. Connector conduits 160 and 150 couple the heat exchanger, i.e. evaporator 140' to the respective return conduit 160 and supply conduit 150. A pump 7 circulates the coolant fluid through the exchanger 140' and the distribution conduit system. Cooling air flows through the cooling plant 140 to remove heat from the coolant in the evaporator 140'. After taking up heat from the heat exchanger 140', the cooling air flow is exhausted overboard outside of the aircraft fuselage skin 16 as indicated by exhaust arrow 14'. If need be, the cooling air flow can be driven or supplemented by a blower 15. As a further source of cooling for the cooling plant 140, a skin heat exchanger may be arranged on the outer skin 16 of the aircraft fuselage as schematically shown in FIG. 2 (dotted lines), and the coolant fluid then passed through this skin heat exchanger, Le. the connector conduits 150' and 160' coupled to the skin heat exchanger instead to the compressor cooling unit. Such direct external cooling is particularly effective when the aircraft is at cruising altitudes. For this reason, the skin heat exchanger should be used only as a supplemental cooling source, with other cooling sources providing the required cooling when the external temperatures are not sufficiently cold. In a preferred embodiment, the operation of the cooling plant 140 is controlled by a regulating unit. The regulating unit controls the internal refrigeration loop in the cooling plant 140 and the coolant supply temperature in the supply conduit 150 such that the temperature in the galley heat exchangers 9A, 9B is kept just above 32° F. to prevent freezing. Other system parameters may be included in the control, for example, the external cooling air flow through the cooling plant 140 by controlling the blower 15, or the switching of the blower 13A, 13B in the secondary air circuit 12A, 12B in each galley. Temperature sensors 1405 are 1605 arranged at least in the galley heat exchanger to provide corresponding temperature input signals to the regulating unit 1406. For the sake of clarity in FIG. 2, the necessary connections between the sensors, the blowers and the regulating unit are not shown. However, appropriate electric circuits can be provided in a generally known manner to carry the necessary control signals.

Figure 6:
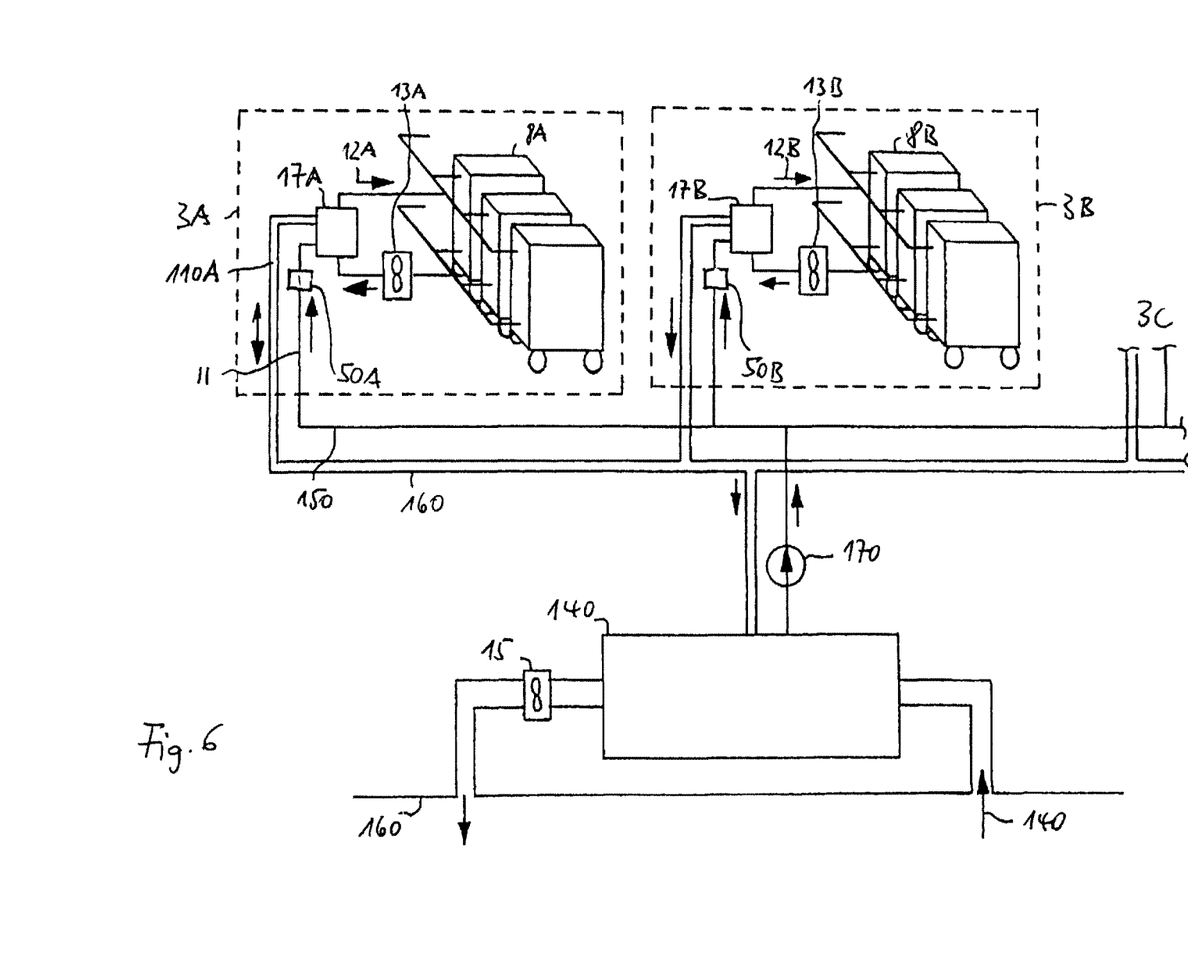
FIG. 6 is a schematic view similar to that of FIG. 5, but showing an absorption cooling system according to the invention, using a refrigerant in a system including an evaporator and a condenser.

FIG. 6 shows an alternative embodiment of the cooling system according to the invention. In this embodiment, the cooling medium is a vaporizable refrigerant, and the cooling plant 140 comprises an adsorption cooling apparatus, using an adsorption medium such as zeolite and water as a cooling medium, for example. The heat exchanger provided in each of the galleys 3A, 3B according to the invention is embodied as an evaporator unit 17A, 17B. Each of the evaporator units 17A, 17B includes an evaporator and an associated through-flow volume control valve as is generally known in the art. The liquid refrigerant or cooling medium is provided to the evaporator 17A, 17B through the liquid medium supply conduit 150 and the connector conduit 11. After it is vaporized in the evaporator unit 17A, 17B, the cooling medium returns as a vapor through the connector conduit 151 and the vapor return conduit 6 to the cooling plant 140. If necessary, the liquid cooling medium can be driven through the conduit system by a pump 170'. The vapor cooling medium returning to the cooling plant 140 is sucked up by the adsorption medium and is then adsorbed thereby. Through the above described embodiments of the present invention, it is possible to use a central cooling plant in conjunction with the secondary cooling air circuits 12A, 12B that are typically provided in the on-board galleys already existing in an aircraft. The existing cooling trolleys need not to be modified. The cooling energy provided by the central cooling plant is efficiently coupled to the air flow used as a cooling medium in the secondary cooling circuits in each galley without requiring substantial reconstruction of the secondary cooling system already provided in the galleys. According to the invention, the galleys can be relocated to various desired positions within the aircraft cabin to achieve different cabin configurations or layouts. Preferably, the cooling plant operates without CFCs to achieve environmental advantages.

The invention claimed is:

1. A supply system with a plurality of consumers, which can be supplied with a minimum volumetric flow of a fluid by the supply system to ensure operational function thereof, the supply system comprising:
   a network of lines with a plurality of lines, which are each connected to the consumers;
   a pump connected to the lines for generating a volumetric flow of the fluid in the lines, wherein at least two of the consumers are fluidically connected in parallel in relation to the pump arrangement: and
   one or more throttle valves allocated to each of the two consumers;
   wherein the one or more throttle valves are functionally placed upstream from a respective one of the two consumers in a cooling circulation, relative to a position of the pump in a direction of flow;
   wherein the one or more throttle valves are self-regulating and configured to maximally limit a volumetric flow by generating a disproportional rise in pressure loss when a rated volumetric flow threshold in a respective one of the plurality of lines is exceeded, the disproportional rise in pressure loss being relative to a rate of increase in pressure loss below the rated volumetric flow threshold: and
   wherein the volumetric flow processed by each consumer deviates at most by 20% from the rated volumetric flow threshold.

2. The supply system according to claim 1, wherein a throttle valve is integrated at least in regions of the line network in each consumer.

3. The supply system according to claim 1, wherein the supply system is a cooling system of an aircraft, and a cooling medium is used as the fluid.

4. The supply system according to claim 1, wherein the supply system is an air conditioning system of an aircraft, and air is used as the fluid.

5. The supply system according to 1, wherein the supply system is a hydraulic system of a vehicle.

6. The supply system according to claim 1, wherein the fluid is an incompressible medium.

7. The supply system according to claim 1, wherein diameters of the plurality of lines of the cooling circulation are constant within a maximum deviation of 10%.

8. The supply system according to claim 1, wherein the supply system is a cooling system for cooling storage containers that are stowed in stowage locations within an aircraft fuselage, the cooling system comprising at least one central cooling plant, at least one heat exchanger as a consumer arranged external to the storage containers at each of the stowage locations, a cooling medium, and a cooling medium distribution conduit system connecting the central cooling plant with the at least one heat exchanger, wherein the conduit system includes a supply conduit and a return conduit, which are each connected with the cooling plant, and connector conduits connecting the at least one heat exchanger with the supply and return conduits, and wherein, in each connector conduit, at least one throttle valve is installed, which is functionally placed upstream from a respective consumer in a respective connector conduit as viewed from the position of the pump in the direction of flow.

9. The supply system of claim 8, comprising only one cooling plant.

10. The supply system of claim 8, wherein the supply and return conduits are arranged below a cabin floor and extend over substantially an entire length of a cabin.

11. The supply system of claim 8, comprising:
respective quick connectors provided on respective ones of the connector conduits and adapted to couple the respective connector conduit to one of the return and supply conduits at one of a plurality of coupling locations along the return conduit and the supply conduit, and
comprising connector adapters provided at the plurality of coupling locations along the return conduit and the supply conduit,
wherein the quick connectors are adapted to couple the connector conduits to the connector adapters.

12. The supply system of claim 8, wherein the cooling medium is a liquid coolant, and the conduits of the cooling medium distribution conduit system are liquid coolant conduits.

13. The supply system of claim 8, wherein the cooling medium is a vaporizable refrigerant, the supply conduit is a liquid refrigerant supply conduit, the return conduit is a vapor refrigerant return conduit, and the heat exchanger is an evaporator.

14. The supply system of claim 8, wherein the cooling medium distribution conduit system further comprises a pump adapted to convey the cooling medium through the cooling medium distribution conduit system.

15. The supply system of claim 8, wherein the cooling plant comprises a compression cooling plant.

16. The supply system of claim 8, wherein the cooling plant comprises a fuselage skin heat exchanger arranged on the aircraft fuselage.

17. The supply system of claim 8, wherein the cooling plant comprises a liquid/air heat exchanger adapted to be cooled by a primary cooling air flow, wherein the aircraft further includes air conditioning packs, and wherein the primary cooling air flow is a cooled air flow provided by the air conditioning packs.

18. The supply system of claim 8, wherein the cooling plant comprises an adsorption cooling apparatus.

19. The supply system of claim 12, wherein the liquid coolant is a water/glycol mixture.

* * * * *